July 7, 1959 P. K. BEEMER 2,893,253
VARIABLE PITCH PULLEY MECHANISM
Filed Sept. 27, 1956 2 Sheets-Sheet 1
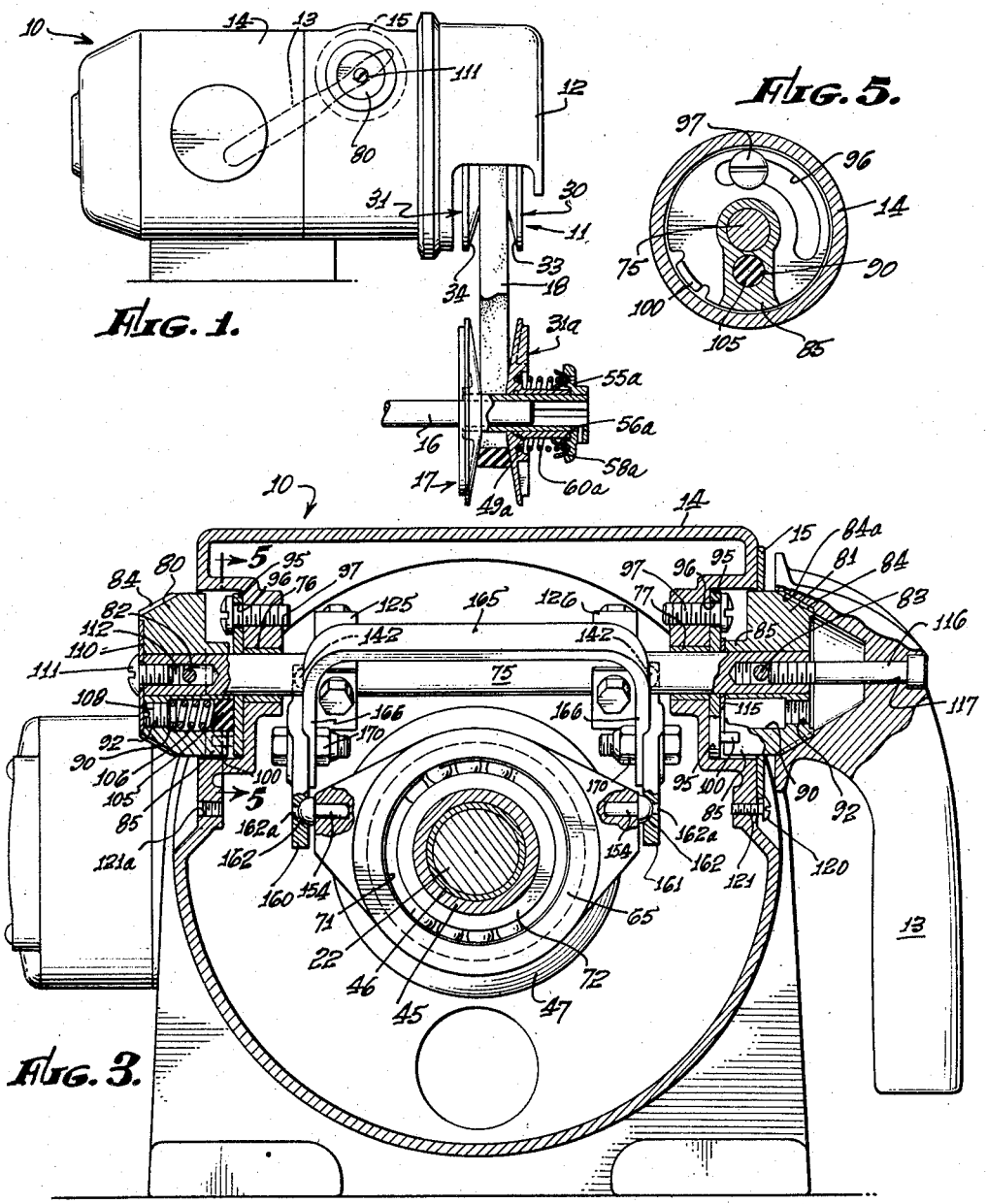
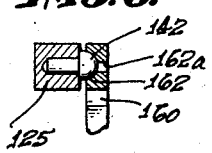
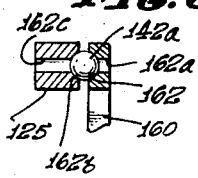
Paul K. Beemer,
INVENTOR.
BY Bakelew & Lewis

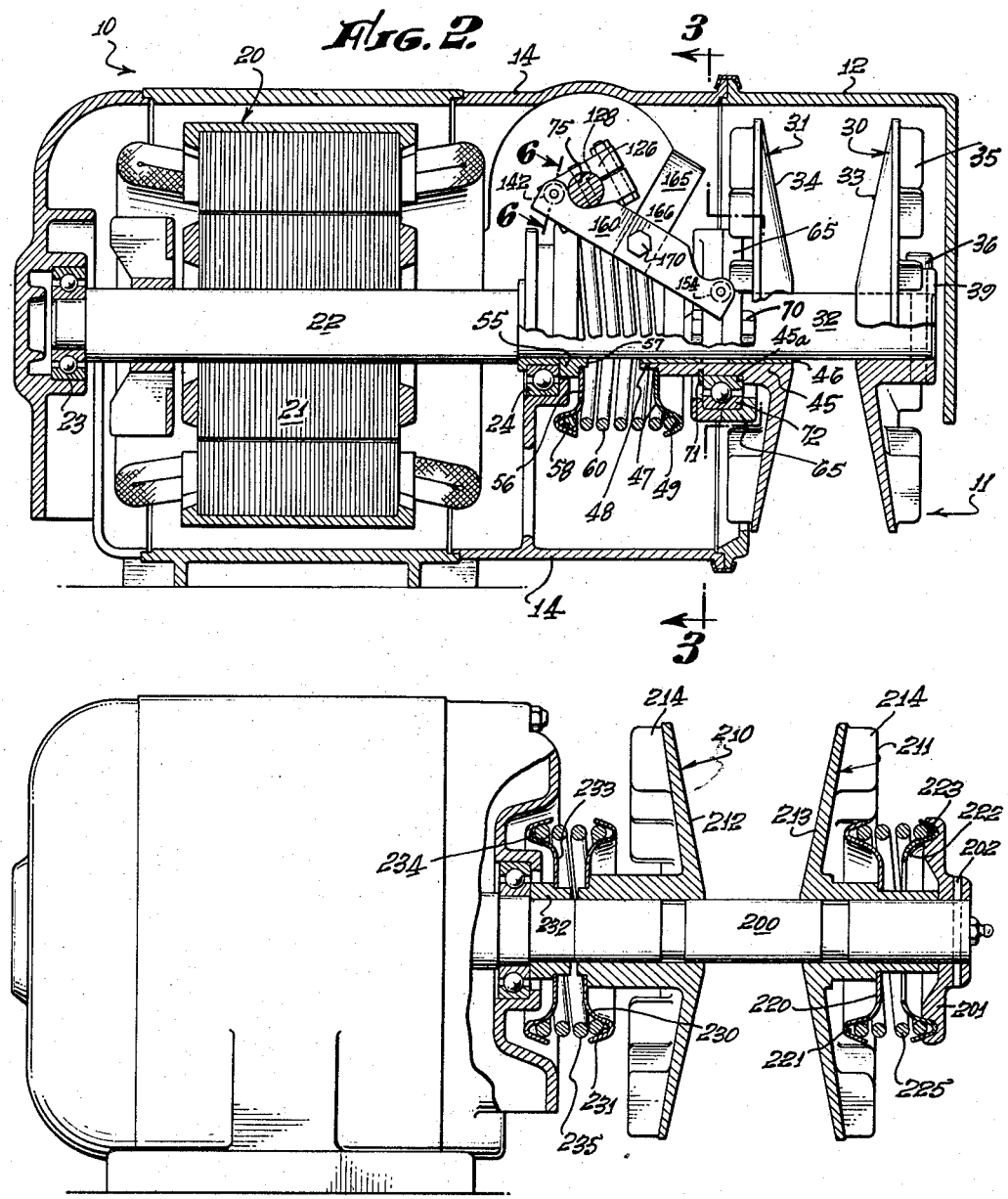

2,893,253

VARIABLE PITCH PULLEY MECHANISM

Paul K. Beemer, Laguna Beach, Calif., assignor to Preco Incorporated, Los Angeles, Calif., a corporation of California Application September 27, 1956, Serial No. 612,392

8 Claims. (Cl. 74—230.17)

The present invention relates to a new and novel variable pitch pulley mechanism and more particularly to a variable pitch pulley mechanism adapted to be drivingly connected by a V-belt with another variable pitch pulley mechanism for providing a speed ratio variation between a driving shaft and a driven shaft.

It is often desirable in various applications to utilize a speed changing transmission which provides an infinitely variable speed ratio between a driving and a driven shaft. One of the most common and successful expedients for accomplishing this result is the utilization of a transmission wherein a V-belt is drivingly connected between two variable pitch pulleys of variable effective diameter wherein the diameter of one pulley is selectively controlled and the diameter of the other pulley is automatically varied inversely in relation to the diameter of the first pulley.

Conventional variable pitch pulleys are generally constructed so that the pulley comprises a pair of pulley members having oppositely facing frusto-conical surfaces adapted to engage the opposite lateral faces of a V-belt. One of the pulley members is usually fixed to the associated shaft and the other pulley member is mounted by means of splines or keyways on the shaft so that it may slide axially of the shaft, yet is constrained to rotate with the shaft. Such spline and keyway as driving connections utilized in conventional variable pitch pulleys of necessity create a certain amount of undesirable friction between the slidable pulley member and the associated shaft, and when torque is being transmitted through the pulley, considerable resistance is offered by such driving connections to movement of the slidable pulley member along the shaft.

In addition, when such a transmission is run for a considerable length of time without changing the speed ratio, another major problem is created. In such a case wherein the movable pulley member remains in a fixed axial position on the shaft for extended periods, a condition sometimes termed "fretting corrosion" often develops which causes the two parts to stick to one another and eventually locks the two parts together so that no relative movement is possible thereby making the mechanism inoperative for the intended purpose of speed regulation.

Various devices have been developed in the prior art to overcome the aforementioned difficulties. An early attempt at solving these problems is disclosed in U.S. Patent No. 2,256,699 wherein a radially corrugated disk spring supports the movable pulley member and provides the driving connection between the shaft and the movable pulley members. Such a construction eliminates a certain amount of friction encountered in prior devices. But practical applications of the device require that the movable pulley members be slidably journaled on the associated shaft. Accordingly, when the device is utilized for quite a while at a given speed ratio, the movable pulleys become locked to the shaft, making the device useless.

A later attempt at solving the aforementioned difficulties is shown in U.S. Patent No. 2,711,103 wherein a pin and associated helical groove provide the driving connection to the movable pulley member. A weak helical spring turns the movable pulley member so that the pin and groove connection moves the pulley member into engagement with an associated belt member. Special bushings are provided for supporting the movable pulley member so that "fretting corrosion" is prevented. This construction, however, is excessively complex and the pin and groove driving connection creates frictional resistance to axial movements of the pulley, and, further, has the serious disadvantage of setting up different axial forces with the rotation in different directions.

The present invention employs an arrangement wherein the sole driving connection between the shaft and the associated movable pulley is through the intermediary of a spring. Such a construction overcomes the difficulties encountered in prior art devices since it eliminates the necessity of splines or keyways for transmitting the drive from the shaft to the movable pulley; and, in addition, the normal variations in torque experienced in most machine applications cause the movable pulley member to rotate occasionally with respect to the shaft due to the fact that the spring driving connection is rotationally yieldable, and in this manner the movable pulley is prevented from sticking or locking to the shaft, due to the slight relative rotational movement therebetween during operation of the device. The spring is connected in a novel manner to the shaft and movable pulley such that the maximum torque transmitted through the spring driving connection is limited, thereby preventing damage to the spring in cases of accidental overloads. It is important to note the distinction between the utilization of a helical spring in a device according to the present invention and the use of a helical spring in a device of the type shown in the aforementioned U.S. Patent No. 2,711,103. In a device as disclosed in the patent, the spring does not transmit the drive to the movable pulley, but merely serves as a means for causing relative movement between the pin and groove driving connection of the device. According to the present inventive concept, the helical spring provides the sole driving connection to the movable pulley member from the shaft.

An object of the present invention is the provision of a new and novel variable pitch pulley mechanism wherein the friction between the movable pulley members and the associated shaft is reduced to a minimum.

Another object is to provide a variable pitch pulley mechanism which substantially eliminates sticking or locking of the movable pulleys to the associated shaft.

Yet another object is to provide a variable pitch pulley mechanism wherein free slack or back-lash in the control means is reduced to a minimum. In variable pitch pulleys of the type here concerned, variations in torque change the force exerted by the belt on the movable pulley member; and if free slack in the control mechanism allows that member to move, an uncontrolled change in drive ratio results. For such reason it is particularly desirable that there be no free slack in the control mechanism of the movable member.

A further object of the invention is a provision of a variable pitch pulley mechanism which is simple and inexpensive in construction, yet sturdy and reliable in operation.

Other objects and many of the attendant advantages of this invention will be readily appreciated as the same becomes better understood by reference to the following detailed description when considered in connection with the accompanying drawings wherein:

Fig. 1 is a view illustrating the general assembly of a speed changing transmission;

Fig. 2 is a longitudinal section through the driving unit shown in Fig. 1;

Fig. 3 is a cross-sectional view taken on line III—III of Fig. 2 looking in the direction of the arrows with some portions of the device cut away for the sake of clarity;

Fig. 4 is a longitudinal section showing a modified application of the invention;

Fig. 5 is a detail section on line 5—5 of Fig. 3;

Fig. 6 is a detail section on line 6—6 of Fig. 2; and

Fig. 6a shows a modification.

Referring now to the drawings wherein like reference characters designate like or corresponding parts throughout the several views, there is shown in Fig. 1 a view of the general assembly of a speed changing transmission wherein 10 indicates generally a driving unit which may be in the form of an electric motor or the like having a variable pitch pulley 11 rotatably fixed to the outer end of the shaft (not shown) of the motor. A cover plate 12 mounted on the end of housing 14 surrounding the motor serves to protect pulley 11 from dirt and other foreign objects, and a control handle 13 is rotatably mounted on housing 14. Handle 13 is adapted to control the position of the movable pulley member of variable pitch pulley 11 and thereby control the speed ratio of the transmission. A dial 15 secured to the housing indicates the speed ratio which is obtained with any particular setting of the control handle 13.

A driven shaft 16 has drivingly supported thereon a variable pitch pully 17 which is adapted to automatically adjust its effective pitch diameter in accordance with variations in the effective pitch diameter of variable pitch pulley 11. A conventional V-belt 18 drivingly connects pulleys 11 and 17, and shaft 16 may be connected to any desired mechanism to be driven, such as a machine tool or the like.

Referring now to Fig. 2, housing 14 encloses a stator 20 and a rotor 21 of a conventional electric motor, rotor 21 being rotationally fixed to a driving shaft 22 which is supported in conventional ball bearing assemblies 23 and 24 mounted in the housing. A variable pitch pulley mechanism including pulley members 30 and 31 is supported on the outer end 32 of shaft 22, and the pulley members are provided with inner frusto conical faces 33 and 34, adapted to engage the opposite lateral surfaces of a conventional V-belt in a well-known manner. Each of pulley members 30 and 31 is provided with cooling fins 35 on the outer face thereof, and pulley member 30 is fixed to the outer end 32 of shaft 22 by means of a pin 36 which passes through aligned openings formed in the hub 39 of pulley member 30 and shaft 22, respectively.

The hub 45 of the movable pulley member 31 is freely mounted on shaft 22 by means of conventional cylindrical bushings 46 disposed between hub 45 and the shaft. An annular spring seat 47 is rotationally secured by any suitable means to the outer periphery of a reduced portion 48 of hub 45 and backs up against a shoulder, as shown. It should be noted that seat 47 is provided with an annular groove 49, and the annular grove has a substantially V-shaped cross-section for a purpose hereinafter described. A sleeve 55 is rigidly fixed to shaft 22 and has a spring seat 56 similar to spring seat 47 fixedly mounted on a reduced portion 57 against a shoulder, as shown. Spring seat 56 is also provided with an annular groove 58 similar to the groove 49 in member 47, groove 58 also having a substantially V-shaped cross-sectional configuration. In general, spring seat 56 is fixed with relation to the shaft, and spring seat 47 is fixed with relation to movable pulley member 31.

A conventional strong helical compression spring 60 has one end thereof seated in the annular grove 58 of spring seat 56 and the opposite end seated in the annular groove 49 of spring seat 47. With the arrangement as disclosed, helical spring 50 exerts an axial force which urges movable pulley member 31 toward fixed pulley member 30 thereby insuring the proper frictional engagement between the pulley members of the device and an associated V-belt.

The opposite ends of driving spring 60 have a frictional engagement with the annular grooves in the respective spring seats, and the included angle of the grooves is such that only a predetermined amount of torque will be transmitted through this frictional connection, and when the torque exceeds the desired amount the frictional connection will slip. The included angle of the substantially V-shaped annular groove in each of the spring seats may be varied in accordance with well-known design characteristics so that, for the selected expansion pressure exerted by the spring, the frictional driving connection between the spring seat members and the spring will slip at any desired amount of torque. In this manner, the amount of torque transmitted through the frictional driving connection of the spring means is limited, and accordingly, any overloads which occur during operation of the device which would otherwise cause damage to helical spring 60 are prevented from affecting the spring since the driving connection will commence to slip when the predetermined amount of torque is reached.

Spring means 60 is designed to be rotationally yieldable so that normal variations in torque which occur in most machine applications cause the movable pulley member 31 to rotate occasionally with respect to shaft 22 due to the torsional elasticity of the spring, and as a result, sticking or locking of the movable pulley and driving shaft 22 is prevented.

It is apparent from the foregoing that the helical driving spring 60 serves several purposes in the present invention. Firstly, spring 60 provides an axial force along shaft 22 tending to move movable pulley 31 towards the fixed pulley. Spring 60 also serves as the sole driving connection between shaft 22 and the movable pulley 31; and in addition, spring 60 in conjunction with annular grooves 49 and 58 also serves to limit the amount of torque which will be transmitted through this type of driving connection. In this manner, the disadvantages of prior art devices are overcome in a simple and compact construction.

Limitation of the torque transmissible through the spring to the pulley member serves to perform another and highly desirable function. Quite commonly the pulleys of a V-belt drive are not set up in accurate alinement. One result of mis-alinement is that the pitch diameters of belt contacts with the two sides of the pulley are not equal. The belt is twisted out of its normal proper plane so that the pitch diameter on one side of the belt is different from that on the other. If the two sides of the pulley are restricted to equal angular speeds the belt is distorted by opposing frictional forces on its two sides and must creep with relation to one or both pulley sides, with resultant destructive wear.

The invention, under those circumstances, limits the degree of belt distortion that may occur, and may entirely obviate slipping creepage of the belt on the pulley sides. This it does by allowing the spring driven pulley side (or either or both sides in the form of Fig. 4) to slip with relation to the shaft and to its drive whenever the stress moment set up on the pulley side by belt distortion becomes greater than the torque transmissible through the over-load transmissions 49 or 58. With slippage taking place there at a lower torque than that at which the belt will slip on the pulley, slippage wear on the belt is entirely obviated. This action is particularly efficacious where the pulley side or sides is or are driven through an elastic member and is or are in more or less constant relative angular movement or oscillation.

Although the structure as defined up to this point is disclosed as being mounted on the driving shaft of a transmission set, it is apparent that it may as well be mounted on the driven shaft thereof, and for example in the transmission assembly illustrated in Fig. 1, a variable pitch pulley similar to that shown in Fig. 2 may be mounted on shaft 16 as indicated by numeral 17 in Fig. 1. In Fig. 1, spring 60a corresponds to spring 60 of Fig. 2. One end of the spring seats in a V-groove 49a which here is formed directly in the shiftable pulley member 31a. The other end of compression spring 60a seats in groove 58a of the seat member 56a, which, via the member 55a, is fixedly mounted on shaft 16. The operation is the same as above-described.

It should also be noted that other suitable types of springs such as a spiral spring or the like may be substituted for helical spring 60. It is essential for proper operation of the device, however, that the driving spring be rotationally yieldable in order to permit the movable pulley members to rotate with respect to the associated shaft. It is also desirable that the spring have a low spring rate in compression, so that in the varying axial positions of pulley member 31, the frictional spring pressure on its seats does not vary materially.

In any speed ratio transmission of the variable pitch pulley type, it is essential that the movable pulley member of one of the variable pitch pulleys be provided with a means for selectively maintaining such movable pulley member positively in a desired position in order to set the speed ratio. In order to prevent changes in load occurring during operation from causing axial movement of the movable pulley member which would accordingly change the speed ratio, it is necessary to provide a control linkage having no free slack or backlash. The novel control linkage employed in the present invention will now be described.

Referring again to Fig. 2, an internally channeled thrust collar 65 is composed of two parts that, held together by bolts 70, clamp the the outer race of thrust bearing 72 between them. The inner race of the bearing shoulders against shoulder 45a on hub 45 of pulley member 31 and is held in place on the hub, tightly against the shoulder, by a snap ring 71. It is evident that the thrust collar provides a means whereby the movable pulley member may be shifted axially along the shaft without obstructing rotational movement thereof, in a well-known manner.

Referring now to Figure 3, an elongated control shaft 75 is journaled by means of bushings 76 and 77 within housing 14, shaft 75 having similar control knobs 80 and 81 secured to the opposite end portions thereof by means of pins 82 and 83 respectively which pass through aligned radial openings in the control knobs and the shaft, respectively. Each of control knobs 80 and 81 is provided with a conical outer surface 84 having a plurality of axially extending serrations formed therein and disposed circumferentially therearound. Each of the control knobs also has a projecting portion 85 (see Fig. 5) formed on the inner end thereof.

Control knobs 80 and 81 are provided with longitudinal off-center bores which extend through projections 85 and are continued to the outer faces of the knobs by threaded openings 92.

Stop disks 95 carry stop lugs 100 adapted to be engaged by projections 85. See Fig. 5. These stop lugs are shown more or less schematically in Fig. 3. The disks are slotted as shown at 96 in Fig. 5, so that, with setting screws 97, the stops can be set in adjusted positions to stop the rotation of knobs 81, and shaft 75, in either direction.

Control knob 80 has a cylindrical friction plug 105 slidably disposed within opening 90 thereof, and the friction plug may be composed of any suitable friction material such as nylon or the like. A small compression spring 106, backed up adjustably by set screw 108, presses the friction plug against disk 95. A cover washer 110 is secured to the outer end of control knob 80 by means of a suitable screw 111 passing through a central opening formed in washer 110 and threaded into a suitable central threaded bore 112 formed in control knob 80.

A spacer and friction washer 115 is disposed between the inner surface of control knob 81 and its associated stop disk 95. Friction washer 115 and friction plug 105 provide in cooperation a frictional detent means whereby control shaft 75 is maintained in any desired rotational position relative to the housing until manually actuated.

Control handle 13 as shown in Fig. 1 is mounted upon control knob 81 in Fig. 3 by means of a suitable bolt 116 which extends through a recessed opening 117 in the control handle and is threaded into threaded bore 112 in that end of shaft 75. Control handle 13 has internal serrations 84a that engage serrations 84 on the knob to hold it rotationally in selected position. Indicating dial 15 which cooperates with handle 13 to indicate the speed ratio for any given rotational position of control shaft 75 is secured to the housing by means of a suitable screw 120 bearing on the edge of the dial 15 and threaded into a threaded opening 121 formed in the housing.

Control handle 13 may be mounted in either knob 81 or 80 to place it at the most convenient side of the unit. The two knobs are duplicates in every respect. Index plate 15 may be shifted to the other side of the casing where a duplicate hole 121a is provided for holding screw 120. Also (although not shown) a friction plug 105 and its spring 106 are preferably provided in openings 91, 93 of knob 81 as well as in knob 80.

Referring conjointly to Figs. 2 and 3, two spaced arms 125 and 126 are clamped on shaft 75 and pinned to it by pins 128 to align the arms in parallelism.

Hemispheric headed pins 142 are set in the outer surfaces of arms 125, 126 at equal radial distances from shaft 75. Two similar hemispheric pins 154 are set oppositely on thrust collar 65.

Two link members 160, 161 adapted to connect the arms 125, 126 to the thrust collar 65 are each provided with substantially hemispherical recesses 162 formed in the opposite end portions thereof adapted to receive the hemispherical end portions of each of the pins 142 and 154. It is accordingly apparent that each of links 160 and 161 are pivotally connected to the associated connecting arms and the thrust collar through a pivotal connection wherein the hemispherical end portions of the pins are seated within the hemispherical recesses formed in the links. The bores shown at 162a assure bearing around the peripheral zones of the pin heads and thus minimize possible loosenesses in the connections. It is obvious that the recesses may be formed in the connecting arms and in the thrust collar with the pins mounted in the links if desired, but the construction as shown is considered preferable.

Fig. 6a shows a modification which may be applied at both ends of the links. In that figure, member 125 is shown as having a seat 162b like seat 162 in link 160, and also having a bore 162c like bore 162a in the link. A steel ball 142a seats in both seats 162 and 162b, the bores 162a and 162c having the function described above.

A substantially C-shaped spring 165, the opposite ends 166 of which are normally stressed inwardly towards one another, are secured to intermediate portions of each of links 160 by bolts 170. The C-shaped spring 165 accordingly provides a resilient force urging links 160 toward one another in such a manner that the hemispherical end portion of each of the pins mounted in the connecting arms and in the thrust collar are urged into the correspondingly shaped recesses formed in the opposite ends of each of the links. In this manner an extremely simple structure is provided whereby free slack and backlash in the control linkage for operating the movable pulley member of the variable pitch pulley is substantially eliminated.

Referring now to Fig. 4 of the drawings, there is shown another application of the invention wherein a shaft 200 corresponding to shaft 22 of the device shown in Fig. 2 has an end cap 201 fixed to the outer end thereof by means of a pin 202. Two movable pulley members 210 and 211 having oppositely facing frusto-conical belt engaging surfaces 212 and 213, respectively, are freely mounted for movement axially and rotationally with respect to shaft 200 and are provided with conventional cooling fins 214 on the outer faces thereof. Pulley member 211 has a first spring seat 220 secured thereto as by welding, or the like, and spring seat 220 is provided with an annular groove 221 in one face thereof having a substantially V-shaped cross-sectional configuration similar to that of the annular grooves in the spring seats of the device shown in Fig. 2. A spring seat 222 is secured to end cap 201 as by welding or the like and is also provided with an annular groove 223 having a similar V-shaped cross-sectional configuration. A helical spring 225 similar to the helical spring 60 of the device shown in Fig. 2 has the opposite ends thereof disposed within annular grooves 221 and 223 whereby the spring functions in a manner similar to that of helical spring 60 in the previously described modification.

Pulley member 210 is provided with a spring seat 230 secured thereto by any suitable means and having an annular groove 231 of a substantially V-shaped cross-sectional configuration. A sleeve 232 fixed to shaft 200 has a spring seat 233 secured thereto as by suitable means, which has an annular groove 234 also having a substantially V-shaped configuration. A helical spring 235 has its opposite end portions disposed within annular grooves 231 and 234 whereby spring 235 operates in a manner similar to the operation of helical spring 225.

It is apparent that the modification disclosed in Fig. 4 differs from that shown in Fig. 2 in that both of the pulley members are movably mounted upon the shaft and are drivingly connected thereto through a helical spring drive connection which is adapted to slip at a predetermined maximum torque. The use of the modification as disclosed in Fig. 4 is advantageous in certain applications in the art wherein it is desirable that a variable pitch pulley achieve ratio variations without disturbing the alignment of the belt, for example when the speed ratio adjustment is achieved by changing the spacing of the driving and driven shafts and the pulley on one shaft is of fixed diameter such as a conventional V-type. Although the modification as shown in Fig. 4 is disclosed as being mounted on a driving shaft, it is apparent that it may also be mounted upon a driven shaft.

It is apparent from the foregoing that there is provided a new and novel variable pitch pulley mechanism wherein the friction between the movable pulley members and the associated shaft is reduced to a minimum and which substantially eliminates sticking or locking of the movable pulley to the associated shaft. The mechanism is simple and inexpensive in construction, yet is very sturdy and reliable in operation, and the free slack or backlash in the control means therefor is reduced to a minimum.

I claim:

1. Variable pitch pulley mechanism which comprises the combination of a shaft, a variable pitch pulley supported on said shaft and comprising a plurality of pulley members having frusto conical belt engaging portions, one of said pulley members being movable relative to another of said pulley members axially of said shaft and also rotationally movable relative to the shaft, spring means exerting a force axially relative to said shaft for resiliently urging said one pulley member toward said other pulley member, said spring means also providing the sole means of drivingly connecting said one pulley member to said shaft for rotation therewith, said spring means being rotationally yieldable whereby said one pulley member may limitedly rotate with respect to said shaft in response to variations in torque during operation of the mechanism, and control means for maintaining said one pulley member positively in a desired fixed position axially of said shaft during operation of the mechanism.

2. The combination as defined in claim 1, wherein said control means includes a thrust bearing connected to said one pulley member, an operating shaft, a pair of connecting arms secured to said operating shaft, a pair of links each of which has one end portion thereof pivotally connected to said thrust bearing and the opposite end portion thereof pivotally connected to one of said connecting arms, each of said pivotal connections between two associated members comprising a pivot member having a substantially hemispherical end portion and being secured to the first associated member of each piovtal connection, the second associated member of each pivotal connection having a recess formed therein, said end portion of the pivot member being disposed within said recesses, and spring means connected between intermediate portions of said links for urging said end portions of the pivot members of each of said pivotal connections into said recesses.

3. The combination as defined in claim 2, including a housing for journaling said operating shaft, and friction means supported by said housing for maintaining said operating shaft in a desired rotative position with respect to said housing.

4. Variable pitch pulley mechanism which comprises in combination a shaft, a variable pitch pulley supported on said shaft and comprising a plurality of pulley members having frusto conical belt engaging portions, one of said pulley members being movable relative to another of said pulley members axially of said shaft and also rotationally movable relative to the shaft, spring means exerting a force axially relative to said shaft for resiliently urging said one pulley member toward said other pulley member, said spring means also providing the sole means of drivingly connecting said one pulley member to said shaft for rotation therewith, said spring means being rotationally yieldable whereby said one pulley member may rotate with respect to said shaft in response to variations in torque during operation of the mechanism, means for definitely limiting the maximum torque transmitted to and through the spring means driving connection between said shaft and said one pulley member, and control means for maintaining said one pulley member positively in a desired fixed position axially of said shaft during operation of the mechanism.

5. Variable pitch pulley mechanism which comprises in combination a shaft, a variable pitch pulley supported on said shaft and comprising a plurality of pulley members having frusto conical belt engaging portions, one of said pulley members being movable relative to another of said pulley members axially of said shaft, and also rotationally movable relative to the shaft, spring means exerting a force axially relative to said shaft for resiliently urging said one pulley member toward said other pulley member, said spring means also providing the sole means of drivingly connecting said one pulley member to said shaft for rotation therewith, said spring means being rotationally yieldable whereby said one pulley member will rotate with respect to said shaft in response to variations in torque during operation of the mechanism, a first spring seat drivingly connected to said shaft and having a first annular groove formed in one face thereof, a second spring seat drivingly connected to said one pulley member and having a second annular groove formed in one face thereof, one end portion of said spring means being disposed in said first annular groove and the opposite end portion of said spring means being disposed in said second annular groove, each of said grooves having a generally V-shaped cross-sectional configuration, control means for positively maintaining said one pulley member in a desired fixed position axially of said shaft, said control means including a thrust bearing connected to said one pulley member, an operating shaft, a pair of connecting arms secured to said operating shaft, a pair of links each of which has one end portion thereof pivotally connected to said thrust bearing and the opposite end portion thereof pivotally connected to one of said connecting arms, each of said pivotal connections between two associated members comprising a pivot member having a substantially hemispherical end portion and being secured to the first associated member of each pivotal connection, the second associated member of each pivotal connection having a recess formed therein, said end portions of said pivot member being disposed within said recesses, and spring means connected between intermediate portions of said links for urging said end portions of the pivot members of each of said pivotal connections into said recesses.

6. Variable pitch pulley mechanism comprising the combination of a shaft member, a variable pitch pulley supported on said shaft and including a pair of pulley members having opposed frusto-conical belt engaging portions, one of said pulley members being movable relative to the other axially of the shaft member and also rotationally movable relative to the shaft member, spring means extending axially of the shaft and exerting a force axially of the shaft for resiliently urging said one pulley member toward said other pulley member, said spring means being capable of transmitting rotational torque between its two axial ends and being rotationally yieldable between its said ends, and means rotationally coupling the ends of the spring means to the shaft and to said one pulley member, at least one of said rotational coupling means including a seat for the spring means having an annular frusto-conical seat face at an acute angle to the shaft axis and against which face the spring means seats pressurally in an axial direction to form a slippable frictional connection transmitting a definite but limited rotational torque.

7. Variable pitch pulley mechanism comprising the combination of a shaft member, a variable pitch pulley supported on said shaft and including a pair of pulley members having opposed frusto-conical belt engaging portions, one of said pulley members being movable relative to the other axially of the shaft member and also rotationally movable relative to the shaft member, spring means extending axially of the shaft and exerting a force axially of the shaft for resiliently urging said one pulley member toward said other pulley member, said spring means being capable of transmitting rotational torque between its two axial ends and being rotationally yieldable between its said ends, and means rotationally coupling the ends of the spring means to the shaft and to said one pulley member, at least one of said rotational coupling means including a seat for the spring means with an annular groove of V-shaped cross-sectional formation in which one end of the spring means seats pressurally in an axial direction to form a slippable frictional connection transmitting a definite but limited rotational torque.

8. The combination defined in claim 7, and in which the means coupling the ends of the spring means to the shaft and to said one pulley member each include a seat for the spring means with an annular groove of V-shaped cross-sectional formation in which one end of the spring means seats pressurally in an axial direction to form a slippable frictional connection transmitting a definite but limited rotational torque.

References Cited in the file of this patent

UNITED STATES PATENTS

| | | |
|---|---|---|
| 818,047 | Power | Apr. 17, 1906 |
| 1,237,866 | Burton | Aug. 21, 1917 |
| 1,241,148 | Porter | Sept. 25, 1917 |
| 2,181,627 | Peterson | Nov. 28, 1939 |
| 2,236,355 | Russell | Mar. 25, 1941 |
| 2,582,067 | Reeves | Jan. 8, 1952 |
| 2,607,235 | Ruegenberg | Aug. 19, 1952 |
| 2,636,396 | Reeves | Apr. 28, 1953 |
| 2,746,816 | Michie et al. | May 22, 1956 |